United States Patent
Andersson

(10) Patent No.: US 10,781,662 B2
(45) Date of Patent: Sep. 22, 2020

(54) DRAIN-BACK CHECK VALVE ASSEMBLY

(71) Applicant: Flomatic Corporation, Glens Falls, NY (US)

(72) Inventor: Allan Bo Andersson, Cambridge, NY (US)

(73) Assignee: Flomatic Corporation, Glens Falls, NY (US)

( * ) Notice: Subject to any disclaimer, the term of this patent is extended or adjusted under 35 U.S.C. 154(b) by 553 days.

(21) Appl. No.: 15/798,451

(22) Filed: Oct. 31, 2017

(65) Prior Publication Data
US 2019/0128100 A1   May 2, 2019

(51) Int. Cl.
| | | |
|---|---|---|
| E21B 34/08 | (2006.01) | |
| F16K 15/02 | (2006.01) | |
| E21B 43/12 | (2006.01) | |
| B65G 5/00 | (2006.01) | |
| E21B 43/40 | (2006.01) | |

(52) U.S. Cl.
CPC ............ *E21B 34/08* (2013.01); *E21B 43/128* (2013.01); *F16K 15/026* (2013.01); *B65G 5/005* (2013.01); *E21B 43/40* (2013.01); *E21B 2200/06* (2020.05); *Y10T 137/2544* (2015.04); *Y10T 137/2557* (2015.04)

(58) Field of Classification Search
CPC ......... Y10T 137/2544; Y10T 137/2557; E21B 34/08; E21B 43/128
See application file for complete search history.

(56) References Cited

U.S. PATENT DOCUMENTS

| | | | | |
|---|---|---|---|---|
| 3,827,451 A | * | 8/1974 | Roob ................... | F16D 25/046 137/102 |
| 3,967,635 A | * | 7/1976 | Sealfon ............... | B01F 3/04815 137/102 |
| 4,428,392 A | * | 1/1984 | Jones .................. | A61M 16/208 128/205.24 |
| 6,289,990 B1 | * | 9/2001 | Dillon .................... | E21B 34/08 166/319 |
| 6,655,405 B2 | * | 12/2003 | Hollister ................. | E21B 34/02 137/102 |
| 8,281,866 B2 | * | 10/2012 | Tessier .................... | E21B 34/08 166/373 |
| 8,545,190 B2 | * | 10/2013 | Osborne ............... | F16K 17/196 417/53 |

* cited by examiner

*Primary Examiner* — Kevin F Murphy
(74) *Attorney, Agent, or Firm* — Heslin Rothenburg Farley & Mesiti P.C.

(57) ABSTRACT

A drain-back check valve assembly includes a body having a passageway with an inlet and an outlet. A bypass port extends from the passageway to an outer surface of the valve body. A main poppet valve assembly is disposed in the passageway and moveable between a closed position which prevents fluid flow from the outlet to the inlet and an open position which allows fluid flow from the inlet to the outlet. The main poppet valve assembly includes a poppet and a spool guide fixed to the poppet. The guide has a sidewall which includes a drain-back port. When the main poppet valve assembly is in the closed position, the drain-back port is aligned with the bypass port. When the main poppet valve assembly is in the opened position, the drain-back port is not aligned with the bypass port.

24 Claims, 8 Drawing Sheets

DRAIN-BACK CHECK VALVE ASSEMBLY

TECHNICAL FIELD

The present invention relates to valve assemblies for water distribution systems. More specifically, the invention relates to drain-back check valve assemblies having check valve and drain-back valve functionality for a well system.

BACKGROUND

Well systems (or wells) are often used to extract water from underground aquifers. Typically such well systems will include:
  a submersible pump disposed in the aquifer;
  a check valve connected to the pump;
  a riser pipe connected to the check valve;
  a drain-back valve installed in the riser pipe just below the frost level; and
  a ground level tank connected to the upper end of the riser pipe.
For industrial applications there are often a plurality of well systems in a well field that are connected to a plurality of tanks in a tank farm.

Often there is a need to utilize a well field to extract fluids (such as water) from an aquifer, as well as to recharge the aquifer with fluids. For example, contaminated water may be extracted from an aquifer through a well system, treated in a tank farm to remove at least a portion of contaminants and recharged back into the aquifer for storage. This type of extraction-treatment-recharge process is commonly done in iterative batch processes several times a day in order to clean an aquifer of contaminants.

Additionally, the well field may be used to store excess water, such run-off water from a large storm, into an aquifer. The water can then be used at a later time for consumption, irrigation or the like.

Moreover, the fluid does not always have to be water. For example, a well field may be used to remove or recharge an aquifer with an acid/copper solution used in a mining operation.

Problematically however, an underground aquifer can be located several hundred feet below the ground level surface. Additionally, typical conventional check valves, used to protect the pump from back flow, are designed for only one way flow and do not allow for any drain-back of the fluid into the aquifer. This means that the column of fluid trapped in the riser pipe will be large and heavy. As such the pump must be sized much larger than it would normally be if it has to start up against the full back pressure of the trapped fluid column in the riser pipe.

Moreover, a typical prior art drain-back valve, which does allow for drain-back of fluid, is installed in the riser pipe at only about 10-15 feet below ground level. This is because the prior art drain-back valves function to drain-back fluid just below the frost line in order to prevent the riser pipe from freezing and bursting. However, these conventional drain-back valves are designed to close at about 5 psi pressure, making them unworkable at levels below about 15-25 feet. Accordingly, such conventional drain-back valves can only drain fluid from a small upper portion of a large riser pipe.

Break-off plugs can be installed in the riser pipe near the check valve in order to drain the riser pipe when the pump is turned off. The break-off plugs are designed to break off when a weight is dropped down the riser pipe and leave a bypass port in the sidewall of the riser pipe through which fluid can drain-back into the well when the pump is turned off. However, since the bypass port will also be open when the pump is on, the full (or maximum) fluid capacity of the pump will be split between the bypass port and the riser pipe. As such, the pump's capacity will be significantly reduced. For example, as much 30 percent of the pump's flow capacity could be diverted through such bypass ports.

Calibrated orifices can be disposed in the poppet of the check valve itself in order to drain the riser pipe. However, these calibrated orifices problematically provide backflow of fluid directly into the outlet of the pump. Therefore, the orifices must be calibrated such that the drain-back flow is not large enough to induce the pump to turn backwards, since that could damage the pump bearings once the pump starts up. Accordingly, the drain-back process with these calibrated orifices is slow and significantly limits the number of times a pump can be turned on and off during a specific time period.

Additionally, because prior art check valves allow only one-way flow (for which they are designed) with very limited drain-back capabilities, a well field is often divided into injection wells and recovery wells. The injection wells are designed to include the conventional check valves and to remove fluid from an aquifer. The recovery wells do not include the prior art check valve and are designed to pump (or recharge) fluid from the ground level back into the aquifer. This disadvantageously requires two types of well systems to perform both the removal and recharge processes. Moreover, there is no guarantee that the recovery wells and injection wells will be pumping in and out of the same aquifer.

Accordingly, there is a need for a drain-back check valve assembly that has both check valve and drain-back valve functionality. Additionally there is a need for a drain-back check valve assembly that can drain-back fluid from a riser pipe at rates that rival or exceed the pumping capacity of the pump. Moreover, there is a need for a drain-back check valve assembly that will allow the full fluid flow capacity of the pump to be fully directed up the riser pipe without diverting some of the flow through any open bypass ports used for the drain-back function. Also there is a need for a drain-back check valve assembly that can prevent fluid from draining back into the outlet of the pump and potentially damage the pump.

BRIEF DESCRIPTION

The present invention offers advantages and alternatives over the prior art by providing a drain-back check valve assembly with both drain-back and check valve functionality, that can drain-back a riser pipe at rates that equal or exceed the pumping capacity of the pump, that will allow the full capacity flow of the pump in both the drain-back and pumping directions, and that will prevent drain-back flow from entering the outlet of the pump.

An exemplary embodiment of a drain-back check valve assembly in accordance with one or more aspects of the present invention includes a valve body. The valve body includes a passageway having an inlet, an outlet and a peripheral inner surface circumferentially disposed around a central axis of the valve body. The valve body also includes a bypass port extending substantially radially to the central axis from the inner surface of the passageway to an outer surface of the valve body. A main poppet valve assembly is disposed in the passageway and moveable between a closed position which prevents fluid flow from the outlet to the inlet and an open position which allows fluid flow from the inlet to the outlet. The main poppet valve assembly includes a poppet disk and a spool guide rigidly fixed to the disk. The guide has a guide sidewall which includes a drain-back port extending substantially radially to the central axis. When the main poppet valve assembly is in the closed position, the drain-back port is aligned with the bypass port to allow fluid flow through the bypass port. When the main poppet valve assembly is in the opened position, the drain-back port is not aligned with the bypass port to prevent fluid flow through the bypass port.

Another exemplary embodiment of a drain-back check valve assembly in accordance with one or more aspects of the present invention includes a valve body. The valve body includes a passageway having an inlet, an outlet and a peripheral inner surface circumferentially disposed around a central axis of the valve body. The valve body also includes a plurality of bypass ports extending substantially radially to the central axis from the inner surface to an outer surface of the valve body. A main poppet valve assembly is disposed in the passageway and moveable between a closed position which prevents fluid flow from the outlet to the inlet and an open position which allows fluid flow from the inlet to the outlet. The main poppet valve assembly includes a poppet disk and a spool guide rigidly fixed to the disk. The guide has a guide sidewall circumferentially disposed around the central axis. The guide sidewall includes a plurality of drain-back ports and a plurality of spool guide openings extending substantially radially to the central axis. When the main poppet valve assembly is in the closed position, fluid flow through the spool guide openings is prevented and the drain-back ports are aligned with the bypass ports to allow fluid flow through the bypass ports. When the main poppet valve assembly is in the opened position, fluid flows through the spool guide openings, and the drain-back ports are not aligned with the bypass ports to prevent fluid flow through the bypass ports.

An exemplary embodiment of a method of operating a well system in accordance with one or more aspects of the present invention includes providing a well pump disposed within the well system. A riser pipe is also provided. The riser pipe is disposed within the well system and connected to a tank. The tank is mounted on an above-ground surface. A drain-back check valve assembly is provided. The drain-back check valve assembly includes:
  a valve body including a passageway having an inlet connected to an outlet of the pump, an outlet connected to the riser pipe, and a plurality of bypass ports extending substantially radially to a central axis of the passageway, and
  a main poppet valve assembly disposed in the passageway and moveable between a closed position which prevents fluid flow from the outlet to the inlet and an open position which allows fluid flow from the inlet to the outlet, the main poppet valve assembly including a poppet disk, and a spool guide rigidly fixed to the disk, the guide having a guide sidewall which includes a plurality of drain-back ports and spool guide openings extending substantially radially to the central axis,
  wherein, when the main poppet valve assembly is in the closed position, fluid flow through the spool guide openings is prevented and the drain-back ports are aligned with the bypass ports to allow fluid flow through the bypass ports and,
  when the main poppet valve assembly is in the opened position, fluid flows through the spool guide openings and the riser pipe, and the drain-back ports are not aligned with the bypass ports to prevent fluid flow through the bypass ports.

The pump is turned on to pump fluid through the drain-back check valve assembly and the riser pipe to the tank, but not through the bypass ports. The pump is turned off to allow fluid to drain-back down the riser pipe, through the bypass ports and around outside surfaces of both the valve body the pump such that the riser pipe is drained of fluid down to the drain-back check valve assembly.

DRAWINGS

The invention will be more fully understood from the following detailed description taken in conjunction with the accompanying drawings, in which.

Figure 5:
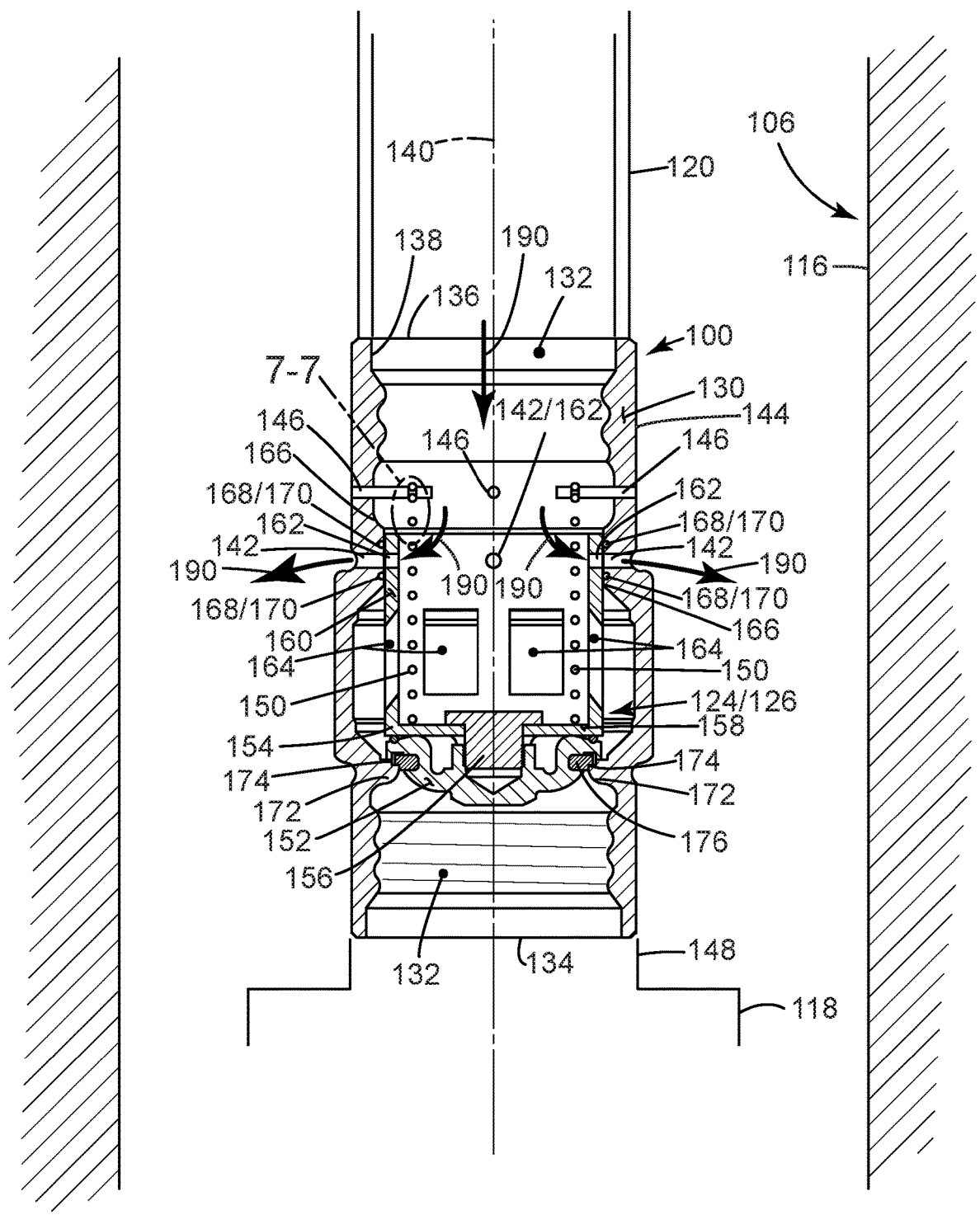
FIG. 5 is an exemplary embodiment of an enlarged cross-sectional view of the drain-back check valve assembly in the circled area 5-5 of FIG. 4 with a main poppet valve assembly of the drain-back check valve assembly in a closed position in accordance with the present invention.
Figure 7:
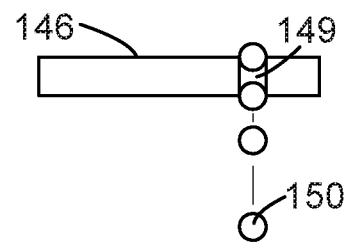
Figure 8:
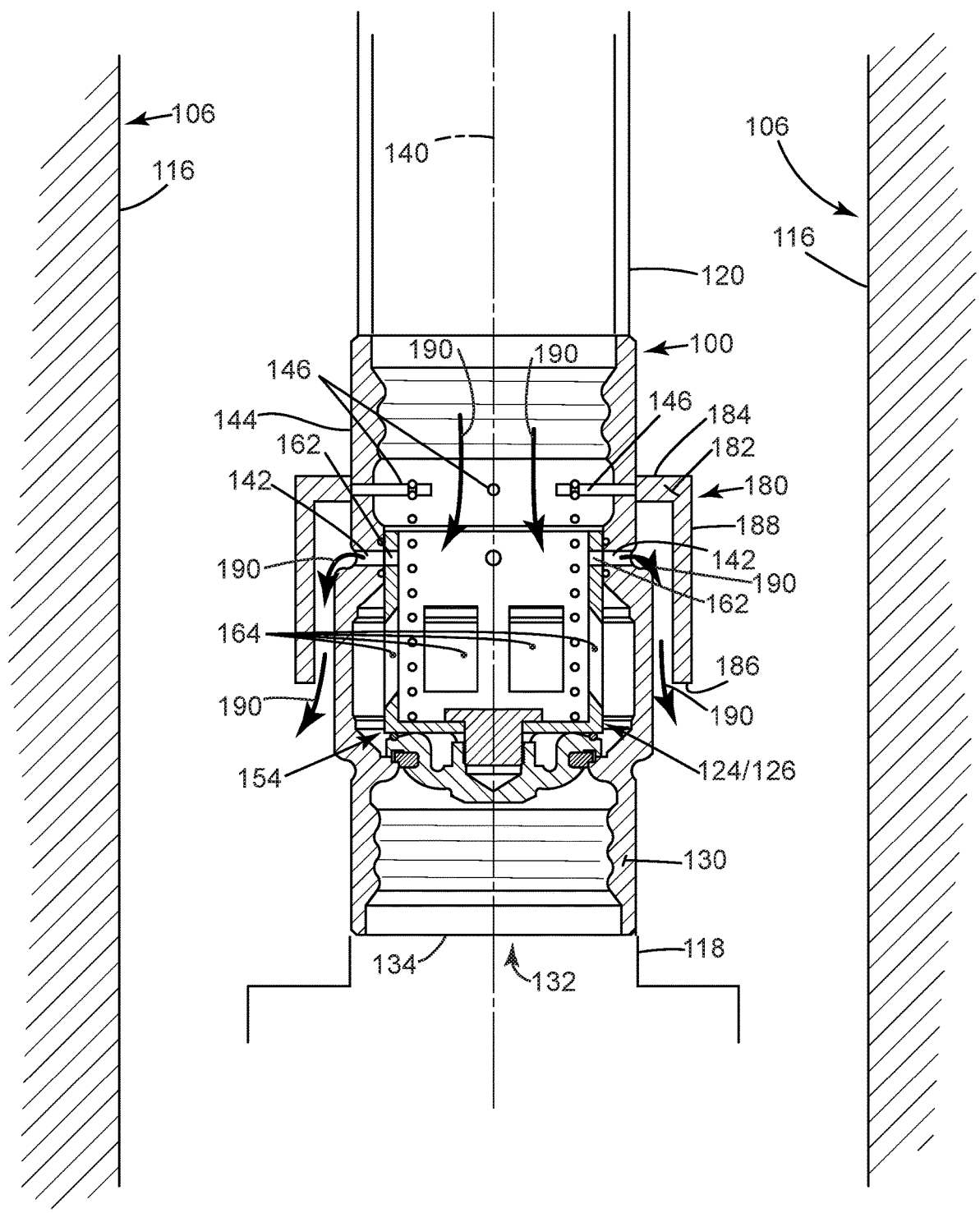

FIG. 7 is an exemplary embodiment of an enlarged cross-sectional view of mechanical stopping posts of the drain-back check valve assembly in the circled area 7-7 of FIG. 5 in accordance with the present invention; and FIG. 8 is an exemplary embodiment of a cross-sectional view of a drain-back check valve assembly with a flow diverter disposed on an outer surface of a valve body of the drain-back check valve assembly in accordance with the present invention.

DETAILED DESCRIPTION

Certain exemplary embodiments will now be described to provide an overall understanding of the principles of the structure, function, manufacture, and use of the methods, systems, and devices disclosed herein. One or more examples of these embodiments are illustrated in the accompanying drawings. Those skilled in the art will understand that the methods, systems, and devices specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Figure 1:
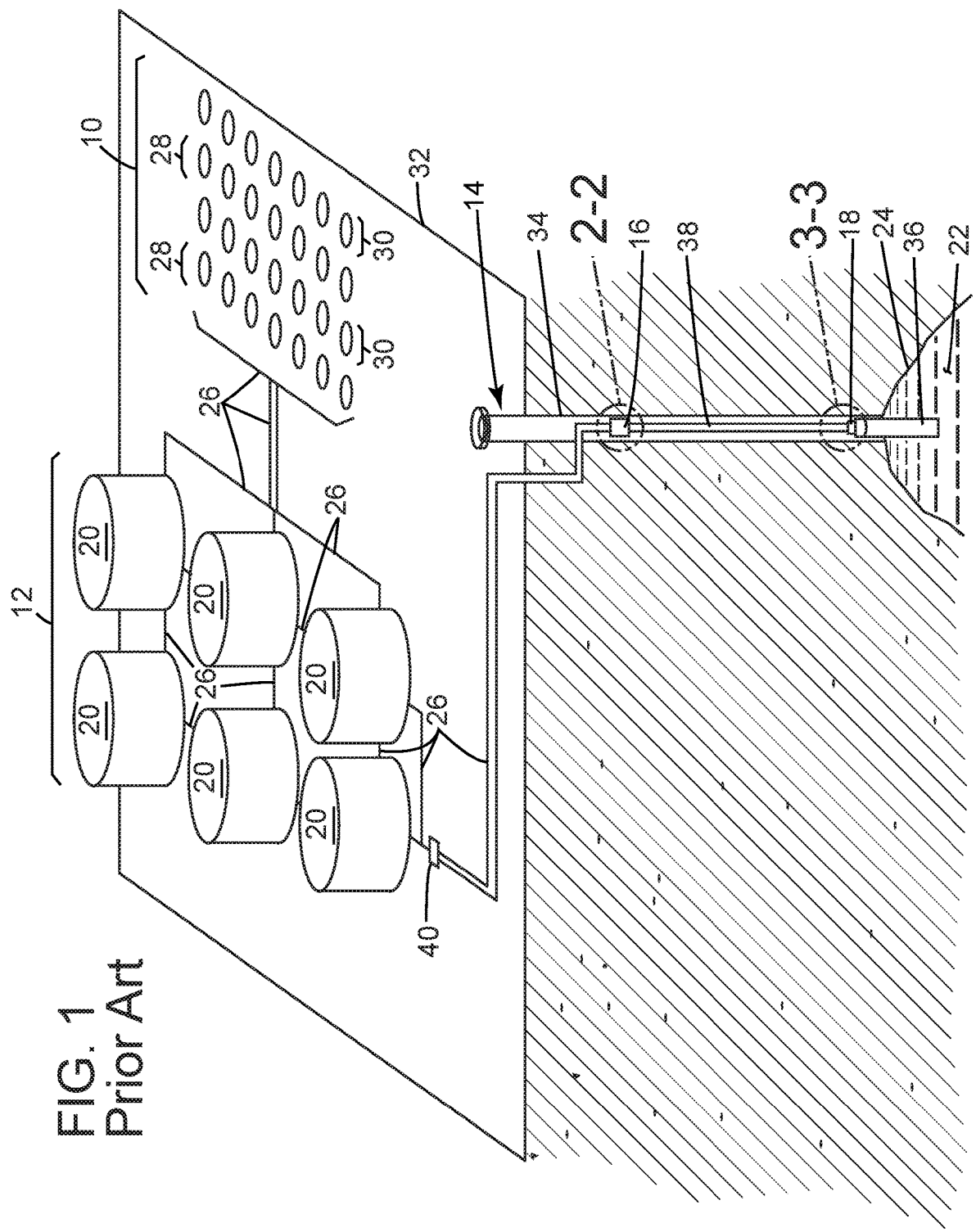
FIG. 1 is an exemplary embodiment of a perspective view of a simplified well field and tank farm, showing one well system with a prior art drain-back valve and a prior art check valve disposed therein.
Figure 2:
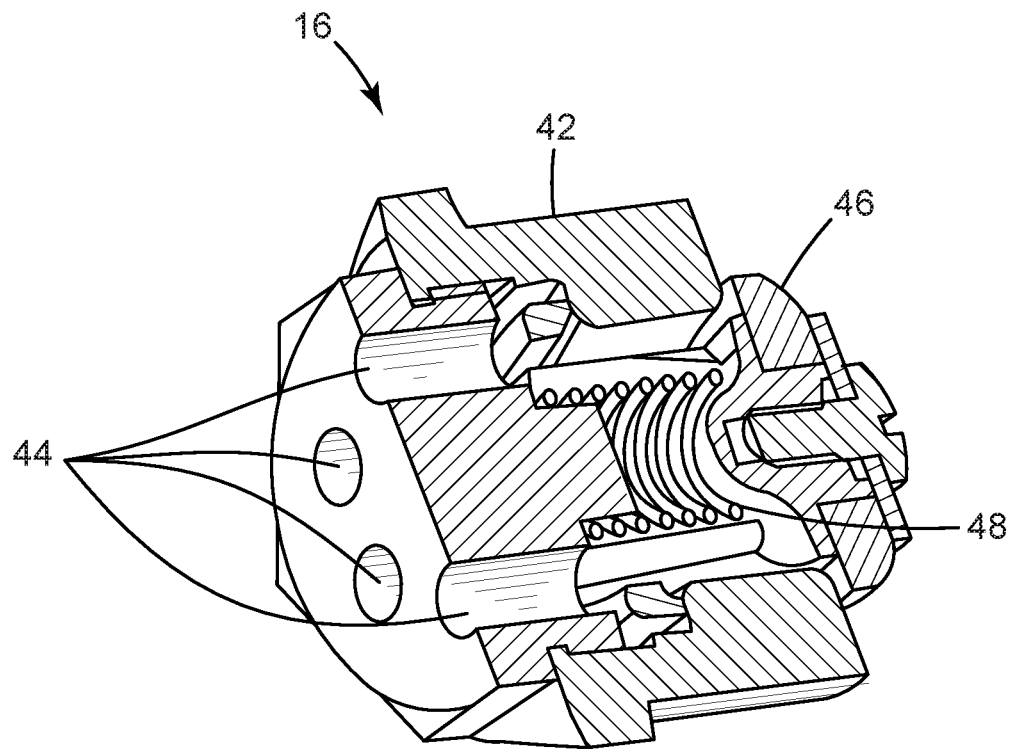
FIG. 2 is an exemplary embodiment of a cross-sectional enlarged view of the prior art drain-back valve in the circled area 2-2 of FIG. 1.
Figure 3:
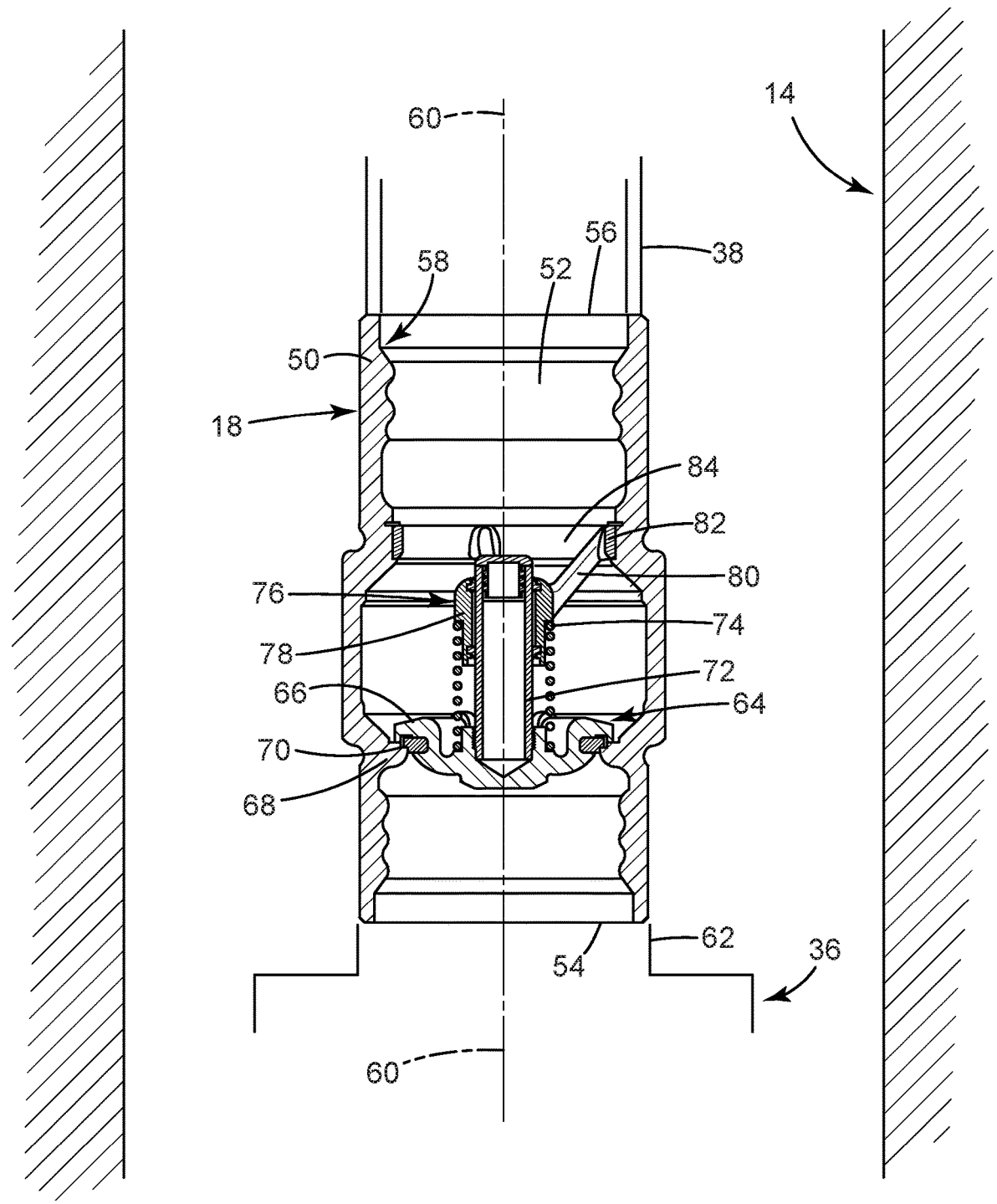
FIG. 3 is an exemplary embodiment of a cross-sectional enlarged view of the prior art check valve in the circled area 3-3 of FIG. 1.

FIGS. 1-3 discuss exemplary embodiments of a prior art well system 14 with a conventional check valve 18 and the problems associated with such a well system. FIGS. 4-8 discuss exemplary embodiments of a well system 106 with a drain-back check valve assembly 100 and exemplary methods of operating the same in accordance with the present invention.

Referring to FIG. 1, an exemplary embodiment of a perspective view of a simplified well field 10 and tank farm 12, showing one well system 14 with a prior art drain-back valve 16 and a prior art check valve 18 is presented. The tank farm 12 includes a plurality of tanks 20 that may be used to store and/or treat water 22 (or other fluids 22) from an underground aquifer 24. The tank farm 12 is connected to the well field 10 by a system of pipelines 26.

The well field 10 includes alternating columns of injection type wells 28 and recovery type wells 30. The injection wells 28 are designed to remove water 22 from the aquifer 24 and include the prior art check valve 18 connected to a submersible pump 36. The recovery wells 30 are designed to pump (or recharge) water 22 from the ground level back into the aquifer 24 and do not include the prior art check valve 18 or submersible pump 36.

The well 14 is a typical injection well 28 which extends from ground level 32 down to the aquifer 24. A well casing 34, which may be composed of such substances as cement, plastic or the like, covers and protects most, if not all, of the vertical sidewalls of the well 14. The submersible pump 36 is disposed within the bottom of the well 14 and is at least partially submerged in the water 22 of the aquifer 24. An outlet of the pump 36 is connected to an inlet of the prior art check valve 18.

A riser pipe 38 is vertically disposed in the well 14 and is connected to an outlet of the check valve 18. The riser pipe 38 may be 6 inches in diameter or larger and may be several hundred feet long. As such, the riser pipe can hold a substantial volume of water 22 above the check valve 18 and exert several hundreds of pounds per square inch (psi) pressure on the check valve. The check valve 18 is designed to protect the pump 36 from this water pressure and from backflow of water 22 down the riser pipe into the outlet of the pump 36, which could damage the bearings and other internal components of the pump 36.

The prior art drain-back valve 16 is installed in the riser pipe 38 just below the frost line and at about 10 to 15 feet below the ground level 32. The drain-back valve 16 is connected via the pipe lines 26 to at least one vacuum break valve 40, which is disposed proximate the tanks 20. The drain-back valve 16 is spring loaded to open when the pump 36 is turned off and there is only about 5-10 psi pressure exerted on the drain-back valve 16 from within the riser pipe 38. As such, water 22 will be allowed to back-drain from the vacuum break valve 40, through the pipe lines 26, out the drain-back valve 16 and down the outer surface of the riser pipe 38. (Note that at pressures higher than about 5-10 psi, the spring loaded drain-back valve 16 will not be able to open.) As the water 22 drains back, the vacuum break valve 40 lets air into the pipe lines 26 to prevent a vacuum from impeding the back flow. Accordingly, this drain-back valve 16 will prevent water accumulating in the pipe lines 26 above the frost line and, therefore, prevent the pipe lines 26 from freezing and bursting in winter conditions.

Problematically however, the prior art drain-back valve 16 cannot operate below about 20 feet, so the column of water 22 from check valve 18 to drain-back valve 16 may still be hundreds of feet long. Further, the prior art check valve 18 typically has no built-in mechanism to drain that column of water 22.

Referring to FIG. 2, an exemplary embodiment of a cross-sectional enlarged view of the prior art drain-back valve 16 in the circled area 2-2 of FIG. 1 is presented. The drain-back valve 16 has a threaded body 42 that is threaded into a port in the riser pipe 38. Exit ports 44 are located at one end of the drain-back valve 16 and a poppet disk 46 is located at an opposing end of the drain-back valve 16. The poppet disk 46 is biased open by a spring 48 located between the exit ports 44 and poppet disk 46.

When the pump 36 is off, there is typically less than 5 psi pressure exerted on the poppet disk 46 by water 22 in the riser pipe 38. Therefore, the spring 48 will be able to bias the poppet disk 46 open and water will flow out the exit ports 44. When the pump is turned on, the water pressure in the riser pipe 38 will rise above 5 psi and the flow velocity will close the poppet disk 46 to prevent water from flowing out of the exit ports 44.

However, if the drain-back valve 16 is located below about 15 feet below ground level 32, the pressure of the water column above the drain-back valve 16 will be great enough to hold the poppet disk 46 closed at all times. Accordingly, this type of prior art drain-back valve 16 is inadequate to drain the entire riser pipe 38 of water 22 down to the check valve 18 and will not allow water to be injected back into the aquafer 24 below a ground level 32 of about 15 feet.

Referring to FIG. 3, an exemplary embodiment of a cross-sectional enlarged view of the prior art check valve 18 in the circled area 3-3 of FIG. 1 is presented. The prior art check valve 18 includes a valve body 50 installed vertically in the well 14. The body 50 includes a passageway 52 having an inlet 54, an outlet 56 and a peripheral inner surface 58 circumferentially disposed around a central axis 60 of the valve body 50.

The inlet 54 of the passageway 52 is connected to an outlet 62 of the pump 36. The outlet 56 of the passageway 52 is connected to the riser pipe 38.

A prior art main poppet valve assembly 64 is disposed in the passageway 52 and moveable between a closed position which prevents fluid flow from the outlet 56 to the inlet 54 and an open position which allows fluid flow from the inlet 54 to the outlet 56. The main poppet valve assembly 64 includes a poppet disk 66, which sealingly engages with an annular flange 68. The annular flange 68 is disposed on the peripheral surface 58 of the passageway 52 proximate the inlet 54 and has a poppet valve seat 70. The poppet valve seat 70, in this particular embodiment, is in the form of a flange "O" ring groove 70.

The prior art main poppet valve assembly 64 also includes a stem 72 extending from the disk 66. The poppet disk 66 is resiliently biased by a spring 74 to sealingly engage against the poppet valve seat 70 when the main poppet valve assembly 64 is in the closed position. The poppet disk 66 is disengaged from the poppet valve seat 70 when the main poppet valve assembly 64 is in the open position.

The main poppet valve assembly also includes a guide 76. The guide 76 includes a sleeve 78, which movably engages the stem 72 as the disk 66 reciprocates from the closed position to the open position. The guide 76 also includes support arms 80 extending radially from the sleeve 78. The distal ends of the support arms 80 include tabs 82 that are disposed in an annular groove 84 within the peripheral surface 58 of the passageway 52, just downstream of the annular flange 68. The tabs 82 are sized to fit within the annular groove 84 to rigidly mount the guide 76 within the passageway 52.

The main poppet valve assembly 64 allows only one way flow from the pump outlet 62 up the riser pipe 38. As such, the check valve 18 protects the pump 36 from potentially damaging pressure and back flow caused by fluid trapped in the riser pipe 38 when the pump 36 is shut off.

Problematically however, the conventional check valve 18 has no convenient mechanism for draining the riser pipe 38 of water 22 (or other fluids). Additionally, the column of water 22 in the riser pipe 38 can be hundreds of feet tall before it reaches the conventional drain-back valve 16 (best seen in FIGS. 1 and 2), which can only function within about 10 to 15 feet below the ground level 32. The larger the column of water trapped in the riser pipe 38, the more the pump 36 would have to be oversized in order to provide the torque required to overcome the resulting back-pressure upon start-up. Additionally, the pump would be difficult to remove and service with such a heavy column of water on top of it.

Bypass ports (not shown) may be drilled into the valve body 50 upstream of the main poppet valve assembly 64 to allow fluid to drain out of the check valve 18 and into the well 14. However, such bypass ports would significantly reduce the pumping capacity of the pump 36, since forward-flow would be split between the bypass ports and the riser pipe 38 when the pump 36 was turned on.

Orifices (not shown) may be drilled into the poppet disk 66 to allow for drain-back of fluid 22. However, the back-flow would directly enter the inlet 62 of the pump 36. Therefore, the orifices must be small enough to prevent the back-flow from rotating the pump 36 in reverse, which could damage the pump bearings and other components on the pump. Accordingly, such a back-drain system would be time consuming and potentially damaging to the pump 36. This issue becomes more problematic for larger pumps (e.g., pumps rated at more than 100 horse power) in industrial applications. Additionally, the drilled orifices would not allow for any significant recharge or injection of water into the aquifer 24.

FIGS. 4-8 discuss various embodiments of a drain-back check valve assembly 100 disposed on a well system 106 and embodiments of operating the same in accordance with the present invention. The drain-back check valve assembly 100 has both drain-back and check valve functionality. The drain-back valve 100 can drain-back a riser pipe at rates that exceed the pumping capacity of the pump. Additionally, the drain-back valve 100 will allow the full capacity flow of the pump in both the drain-back and pumping directions. Moreover, the drain-back check valve assembly 100 will prevent drain-back flow from entering the outlet of the pump.

Figure 4:
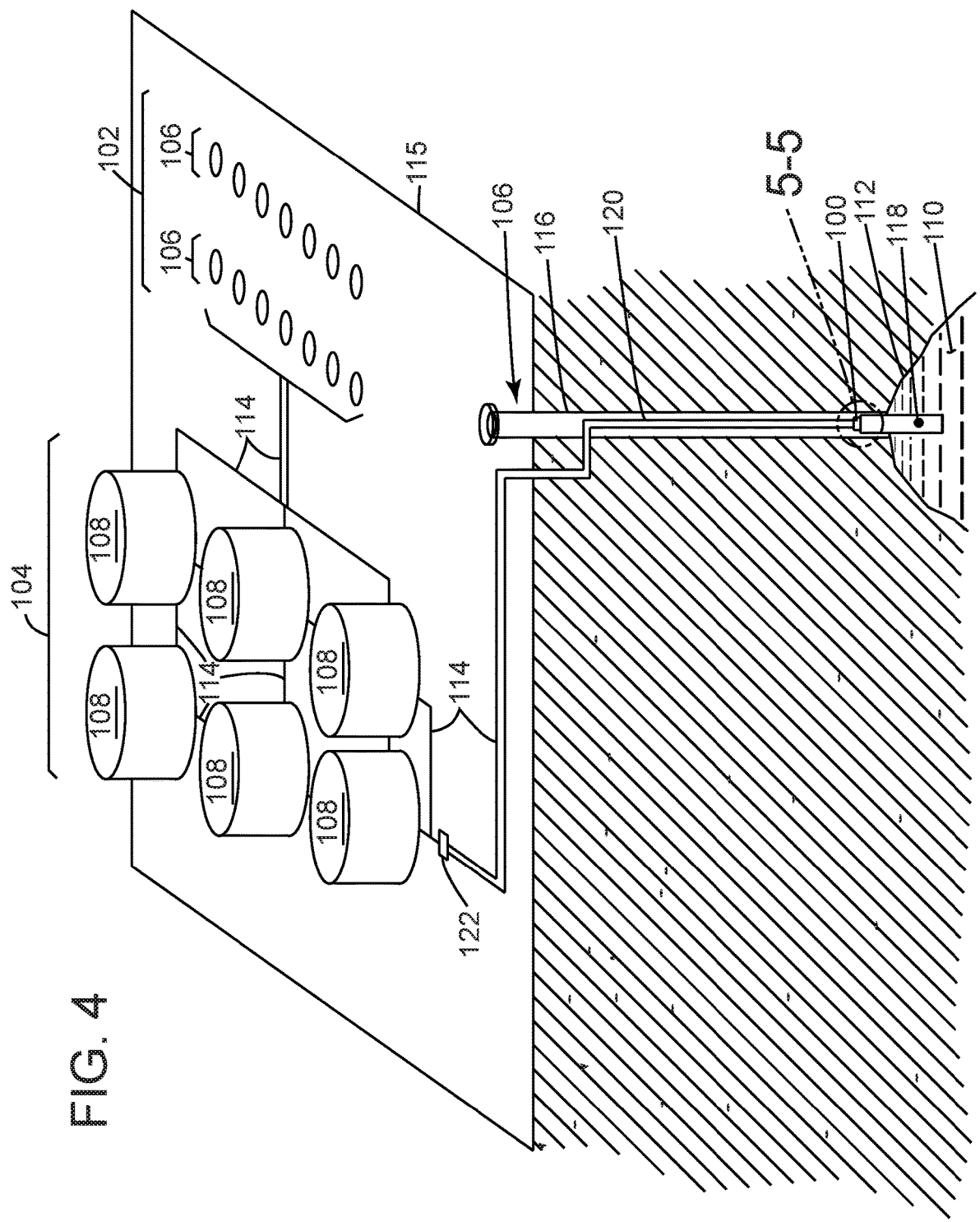
FIG. 4 is an exemplary embodiment of a perspective view of a simplified well field and tank farm, showing one well system with a drain-back check valve assembly in accordance with the present invention.

Referring to FIG. 4, an exemplary embodiment of a perspective view of a simplified well field 102 and tank farm 104, showing one well system 106 with a drain-back check valve assembly (or drain-back check valve) 100 in accordance with the present invention is presented. The tank farm 104 includes a plurality of tanks 108 that may be used to store and/or treat water 110 (or other fluids 110) from an underground aquifer 112. The tank farm 104 is connected to the well field 102 by a system of pipelines 114.

Unlike the prior art well field 10 of FIG. 1, which necessarily included both injection type wells 28 to removed water 22 from an aquifer 24 and recovery type wells 30 to pump water 22 back into the aquifer 24, the well system 106 of FIG. 4 can function as both a recovery well and an injection well. This is because the drain-back check valve assembly 100 can function as both a drain-back valve and a check valve. As such, the well field 102 requires only half the number of wells as prior art well field 10 and the entire well field 102 is composed of the same type well system 106.

The well 106 extends from ground level 115 down to the aquifer 112 in FIG. 4. A well casing 116, which may be composed of such substances as cement, plastic or the like, covers and protects most, if not all, of the vertical sidewalls of the well 106. A submersible pump is disposed within the bottom of the well 106 and is at least partially submerged in the water 110 of the aquifer 112. An outlet of the pump 118 is connected to an inlet of the drain-back check valve assembly 100.

A riser pipe 120 is vertically disposed in the well 106 and is connected to a vacuum break valve 122. Unlike the prior art well system 10 of FIG. 1, no separate check valve (such as prior art check valve 16) is required because the drain-back check valve assembly 100 can function as both a drain-back valve and a check valve and its functionality is not sensitive to distance below ground level 115.

Figure 6:
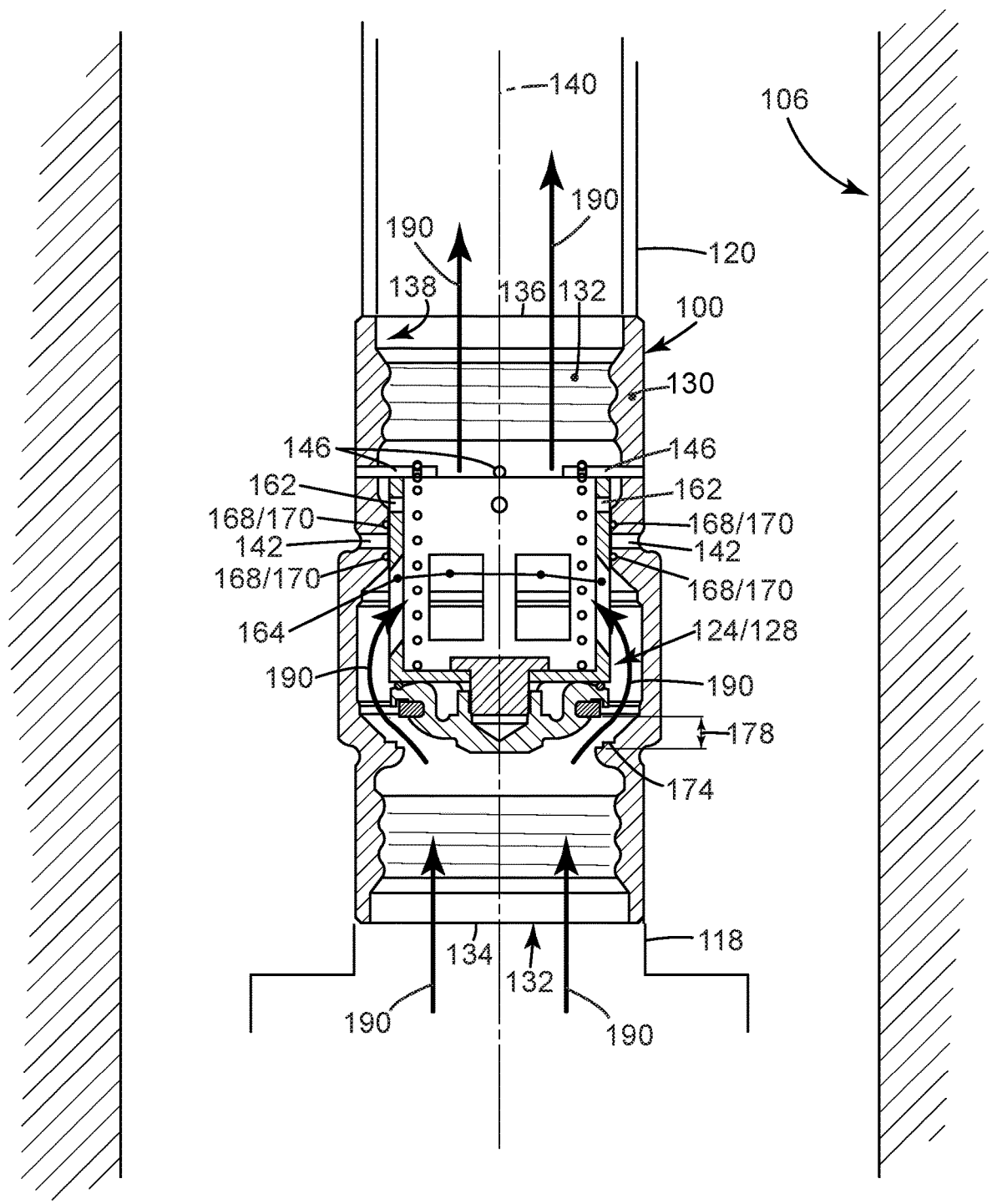
FIG. 6 is an exemplary embodiment of an enlarged cross-sectional view of the drain-back check valve assembly in the circled area 5-5 of FIG. 4 with the main poppet valve assembly in an open position in accordance with the present invention.

Referring to FIGS. 5 and 6, exemplary embodiments of an enlarged cross-sectional view of the drain-back check valve assembly 100 in the circled area 5-5 of FIG. 4 in accordance with the present invention are presented. More specifically, in FIG. 5, the drain-back check valve assembly 100 includes a main poppet valve assembly 124 shown in a closed position 126 and, in FIG. 6, the main poppet valve assembly 124 is shown in an open position 128.

The drain-back check valve assembly 100 includes a valve body 130 installed vertically in the well 106. The valve body has a passageway 132 having an inlet 134, an outlet 136 and a peripheral inner surface 138 circumferentially disposed around a central axis 140 of the valve body 130. The inlet 134 of the passageway 132 is connected to an outlet 148 of the pump 118. The outlet 136 of the passageway 132 is connected to the riser pipe 120.

A plurality of bypass ports 142 extend substantially radially to the central axis 140 from the inner surface 138 to an outer surface 144 of the valve body 130. Additionally, a plurality of rod shaped mechanical stopping-posts 146 extend radially inward from the peripheral inner surface 138 of the passageway 132. As will be discussed in greater detail with reference to FIG. 7, the stopping-posts 146 provide a mechanical stop for the main poppet valve assembly 124 when in its open position 128. Further each of the stopping-posts include annular grooves 149 that are spaced and sized to receive a coil of a spring 150, which is used to bias the main poppet valve assembly 124 into its closed position 126.

The main poppet valve assembly 124 disposed in the passageway 132 and is moveable between the closed position 126 (best seen in FIG. 5) which prevents fluid flow 190 from the outlet 136 to the inlet 134 and the open position 128 (best seen in FIG. 6) which allows fluid flow 190 from the inlet 134 to the outlet 136. The main poppet valve assembly 124 includes a poppet disk 152 and a generally cup shaped spool guide 154 that is rigidly fixed to the disk 152. In this embodiment, the spool guide 154 is fastened to the poppet disk with a threaded bolt 156.

The guide includes a generally circular base 158 that is disposed over the poppet disk 152 and bolted thereto by bolt 156.

The guide also has a guide sidewall 160 that is circumferentially disposed around the central axis 140 and that extends vertically upwards from the periphery of the base 158. The guide sidewall 160 includes a plurality of drain-back ports 162 and a plurality of spool guide openings 164 extending substantially radially through the guide sidewall 160 relative to the central axis 140.

The inner peripheral surface 138 of the passageway 132 has an annular guide surface portion 166 sized to slideably receive the guide sidewall 160. The guide surface portion 166 having the bypass ports 162 disposed therein. The guide surface portion 166 also includes a pair of O-rings 168 disposed in O-ring grooves 170. The O-ring grooves 170 are circumferentially disposed relative to the central axis 140 in the guide surface 166 on opposing sides of the bypass ports 142.

An annular flange 172 is also disposed on the peripheral inner surface 138 of the passageway 132. The annular flange 172 has a poppet valve seat 174. In this embodiment, the poppet valve seat 174 is a groove disposed in the annular flange 172 designed to sealingly engage with a poppet disk O ring 176 disposed around the circumference of the poppet disk 152.

A first end portion of the spring 150 is disposed against the base 158 of the spool guide 154. As such, when the main poppet valve assembly 124 is in the closed position 126 (best seen in FIG. 5), the spring 150 resiliently biases the poppet disk 152 into sealing engagement against the poppet valve seat 174. Additionally, when the main poppet valve assembly 124 is in the open position (best seen in FIG. 6) the disk 152 is disengaged from the poppet valve seat 174.

During operation of the drain-back check valve assembly 100, when pump 118 is turned off, the main poppet valve assembly 124 is biased into its closed position 126 (best seen in FIG. 5) by spring 150 and any fluid 110 disposed in the riser pipe 120. As such, fluid flow 190 through the spool guide openings 164 is prevented. This is because the poppet valve seat 174 of the annular flange 172 is engaged with the poppet disk 152 of the main poppet valve assembly 124 to prevent any back flow of fluid 110 from the riser pipe 120 through the passageway 132 and into the outlet 148 of the pump 118.

However, when the main poppet valve assembly 124 is in its closed position 126, the drain-back ports 162 disposed in the guide sidewall 160 are aligned with the bypass ports 142 disposed in the valve body 130. As such, fluid 110 disposed in the riser pipe 120 back flows through the bypass ports and into the well 106. Advantageously, the riser pipe 120 is drained of fluid 110 without any fluid 110 entering the outlet 148 of pump 118. Rather the fluid 110 flows around the outer surface 144 of the pump 118 and back into the aquifer 112.

Conversely, when pump 118 is turned on, fluid pressure generated from the pump will overcome the pressure generated by spring 150 to force the main poppet valve assembly 124 off of its poppet valve seat 174 and into its open position 128 (best seen in FIG. 6). The guide sidewall 160 of the spool guide 154 will slide along the guide surface portion 166 of the peripheral inner surface 138 of passageway 132 until the distal ends of the guide wall 160 contact the stopping-posts 146 to mechanically limit a travel distance 178 of the main poppet valve assembly 124 from the poppet valve seat 174. Accordingly, fluid 110 flows from the inlet 134 of the passageway 132, through the spool guide openings 164, out the outlet 136 of the passageway 132 and up the riser pipe 120.

However, when the main poppet valve assembly 124 is in its open position 128, the drain-back ports 162 disposed in the guide sidewall 160 are no longer aligned with the bypass ports 142 disposed in the valve body 130. Additionally, the pair of O-rings 168 disposed in their respective O-ring grooves are now sealingly engaged with guide sidewall 160. Accordingly, fluid flow 190 from the passageway 132, through the bypass ports 142 and back into the well 106 is prevented. Advantageously, a maximum capacity of the pump 118 will be utilized to pump the fluid 110 up the riser pipe 120 and out of well 106 without allowing the flow between the bypass ports 142 and riser pipe 120.

Referring to FIG. 7, an exemplary embodiment of an enlarged cross-sectional view of a mechanical stopping post 146 of the drain-back check valve assembly 100 in the circled area 7-7 of FIG. 5 in accordance with the present invention is presented. The plurality of rod shaped mechanical stopping-posts 146 extend radially inward from the peripheral inner surface 138 of the passageway 132. The stopping-posts 146 provide a mechanical stop for the main poppet valve assembly 124 when in its open position 128 (best seen in FIG. 6). Further each of the stopping-posts 146 include annular grooves 149 that are spaced and sized to receive one or more coils of the spring 150. The grooves 149 capture and retain the spring 150 at a second end portion of the spring, while the first end portion of the spring 150 is disposed against the base 158 of the spool guide 154. By retaining the coils of the spring 150 the main poppet valve assembly 124 continuously biases the main poppet valve assembly 124 toward its closed position 126 as the main poppet valve assembly 124 reciprocates between its open and closed positions 126, 128.

Referring to FIG. 8, an exemplary embodiment of a cross-sectional view of the drain-back check valve assembly 100 with a flow diverter 180 in accordance with the present invention is presented. The flow diverter 180 is disposed on the outer surface 144 of the valve body 130 of the drain-back check valve assembly 100. This flow diverter 180 will prevent damaging effects from high velocity flows on the inside well walls.

For optimal operation, the spool guide openings 164 disposed in the spool guide 154 are sized to allow the maximum fluid flow 190 from the pump 118 through the spool guide openings 164 when the main poppet valve assembly 124 is in the open position 128. Additionally, and advantageously, the bypass ports 142 and drain-back ports 162 may also be sized to allow at least the maximum fluid flow capacity of the pump 118 through the bypass ports 142 and back into the well 106 when the main poppet valve assembly 124 is in the closed position 126.

Moreover, the fluid 110 in the riser pipe 120 may be designed to drained back at various specified rates by properly sizing the bypass ports 142 and drain-back ports 162. For example, in a 6 inch riser pipe 120 with a 600 foot column of water disposed in the riser pipe 120, if an initial back-flow of 147 gallons per minute were desired to drain the riser pipe 120, than a total of 6 bypass ports 142 and 6 drain-back ports 162 that are each sized at 0.504 inches in diameter each would be required.

However in that same example, the velocity of the fluid 110 as it passes through the bypass ports 142 and sprays against the well casing 116 would be approximately 161 feet per second. Such a high velocity spray of fluid 110 could damage the well casing 116 or other parts of the well 106.

To protect against such damage, the drain-back check valve assembly 100 may include the flow diverter 180. The flow diverter 180 is rigidly mounted on the outer surface 144 of the valve body 130. The flow diverter 180 has a generally cylindrical body 182 having a closed end 184 and an open end 186 connected therebetween by a diverter shroud 188.

The closed end 184 is rigidly mounted circumferentially around the outer surface 144 of the valve body 130. The diverter shroud 188 is disposed over the bypass ports 142. The diverter shroud 188 is spaced radially away from the bypass ports 142 to allow fluid flow 190 through the bypass port 142 and to divert the fluid flow 190 downward along the outer surface 144 of the valve body 130. The shroud 188 diverts the flow 190 downward along the outer surface 144 of the valve body 130 past the open end 182 and back into the well 106, thus protecting the well casing 116 from damage due to a high velocity spray of fluid 110.

Referring back to FIG. 4, the drain-back check valve assembly 100 provides numerous advantages for the operation of well systems 106 and/or well fields 102 that such a drain-back check valve assembly 100 is disposed in. For example, and without limitation, the pump 118 may be turned on to pump fluid 110 through the drain-back check valve assembly 100 and the riser pipe 120 to the tanks 108, but not through the bypass ports 142. Additionally the pump 118 may be turned off to allow fluid 110 to drain-back down the riser pipe 120, through the bypass ports 142 and around outside surfaces of both the valve body 130 the pump 118 such that the riser pipe 120 is drained of fluid 110 down to the drain-back check valve assembly 100.

Additionally, the submersible pump 118 may be turned on to pump a contaminated fluid 110 out of the well system 106 or well field 102 to the tank 108 or tank farm 104. The contaminated fluid 110 may then be treated to remove at least a portion of the contaminant. Next the treated fluid 110 can be pumped back into the same aquifer 112 through the same well system 106. With prior art injection wells 28 and recovery wells 30 (best seen in FIG. 1) it cannot be certain if the two different well systems 28, 30 are connected to the same underground aquifer.

Moreover, backflow through the submersible pump 118 when pumping the treated fluid 110 back into the same aquifer 112 through the same well system 106 can be prevented. Therefore, such well systems 106 are well suited for batch processing of the contaminated fluids 110 until the entire aquifer 112 is substantially free of treated contaminants.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A drain-back check valve assembly comprising:
    a valve body including:
       a passageway having an inlet, an outlet and a peripheral inner surface circumferentially disposed around a central axis of the valve body, and
       a bypass port extending substantially radially to the central axis from the inner surface of the passageway to an outer surface of the valve body; and
    a main poppet valve assembly disposed in the passageway and moveable between a closed position which prevents fluid flow from the outlet to the inlet and an open position which allows fluid flow from the inlet to the outlet, the main poppet valve assembly including:
       a poppet disk, and
       a spool guide rigidly fixed to the disk, the guide having a guide sidewall which includes a drain-back port and a spool guide opening extending substantially radially to the central axis;
    wherein, when the main poppet valve assembly is in the closed position, the drain-back port is aligned with the bypass port to allow fluid flow through the bypass port and, when the main poppet valve assembly is in the opened position, the drain-back port is not aligned with the bypass port to prevent fluid flow through the bypass port; and
    wherein when the main poppet valve assembly is in the open position, fluid flows from the inlet, through the spool guide opening and out the outlet and, when the main poppet valve assembly is in the closed position, fluid flow through the spool guide opening is prevented.

2. The drain-back check valve assembly of claim 1 wherein the spool guide further includes:
    a generally circular guide base rigidly attached to the poppet disk; and
    the guide sidewall being circumferentially disposed around the central axis and extending substantially perpendicularly from the periphery of the guide base.

3. The drain-back check valve assembly of claim 2 comprising:
    the inner peripheral surface of the passageway having an annular guide surface portion sized to slideably receive the guide sidewall, the guide surface portion having the bypass port disposed therein; and
    a pair of O-rings disposed in O-ring grooves, the O-ring grooves circumferentially disposed in the guide surface on opposing sides of the bypass port;
    wherein, when the main poppet valve assembly is in the open position, the pair of O-rings sealingly engage with the guide sidewall to prevent fluid flow through the bypass port.

4. The drain-back check valve assembly of claim 1 comprising a flow diverter rigidly mounted on the outer surface of the valve body, the flow diverter having a diverter shroud disposed over the bypass port, the diverter shroud being spaced radially away from the bypass port to allow fluid flow through the bypass port and to divert the fluid flow downward along the outer surface of the valve body.

5. The drain-back check valve assembly of claim 4 wherein the flow diverter includes:
    a generally cylindrical body having a closed end and an open end connected therebetween by the diverter shroud;
    wherein the closed end is rigidly mounted circumferentially around the outer surface of the valve body and the shroud diverts the flow downward along the outer surface of the valve body past the open end.

6. The drain-back check valve assembly of claim 1 comprising:
    the bypass port including a plurality of bypass ports;
    the drain-back port including a plurality of drain-back ports; and
    the spool guide opening including a plurality of spool guide openings.

7. The drain-back check valve assembly of claim 6 comprising:
    the spool guide openings sized to allow a maximum fluid flow from a pump through the spool guide openings when the main poppet valve assembly is in the open position; and
    the bypass ports and drain-back ports sized to allow at least the maximum fluid flow through the bypass ports when the main poppet valve assembly is in the closed position.

8. The drain-back check valve assembly of claim 1 comprising:
    an annular flange disposed on the peripheral inner surface of the passageway, the annular flange having a poppet valve seat; and a spring disposed at a first end portion against the spool guide;

wherein, when the main poppet valve assembly is in the closed position, the spring resiliently biases the poppet disk into sealing engagement against the poppet valve seat and, when the main poppet valve assembly is in the open position the disk is disengaged from the poppet valve seat.

9. The drain-back check valve assembly of claim 8 comprising:

a plurality of mechanical stopping-posts extending radially inward from the peripheral inner surface of the passageway;

wherein, when the main poppet valve assembly is in the open position, the stopping-posts contact a distal end of the guide wall to mechanically limit a travel distance of the main poppet valve assembly from the poppet valve seat.

10. The drain-back check valve assembly of claim 9 wherein the plurality of mechanical stopping posts each include annular grooves that are spaced and sized to receive a coil of the spring at a second end portion of the spring, the annular grooves holding the spring in resilient engagement against the poppet disk as the main poppet valve assembly reciprocates between the open and closed positions.

11. A drain-back check valve assembly comprising:
a valve body including:
a passageway having an inlet, an outlet and a peripheral inner surface circumferentially disposed around a central axis of the valve body, and
a plurality of bypass ports extending substantially radially to the central axis from the inner surface to an outer surface of the valve body; and
a main poppet valve assembly disposed in the passageway and moveable between a closed position which prevents fluid flow from the outlet to the inlet and an open position which allows fluid flow from the inlet to the outlet, the main poppet valve assembly including:
a poppet disk, and
a spool guide rigidly fixed to the disk, the guide having a guide sidewall circumferentially disposed around the central axis, the guide sidewall including a plurality of drain-back ports and a plurality of spool guide openings extending substantially radially to the central axis;
wherein, when the main poppet valve assembly is in the closed position, fluid flow through the spool guide openings is prevented and the drain-back ports are aligned with the bypass ports to allow fluid flow through the bypass ports and,
when the main poppet valve assembly is in the opened position, fluid flows through the spool guide openings, and the drain-back ports are not aligned with the bypass ports to prevent fluid flow through the bypass ports.

12. The drain-back check valve assembly of claim 11 comprising:

the inner peripheral surface of the passageway having an annular guide surface portion sized to slideably receive the guide sidewall, the guide surface portion having the bypass ports disposed therein; and a pair of O-rings disposed in O-ring grooves, the O-ring grooves circumferentially disposed in the guide surface on opposing sides of the bypass ports;

wherein, when the main poppet valve assembly is in the open position, the pair of O-rings sealingly engage with the guide sidewall to prevent fluid flow through the bypass ports.

13. The drain-back check valve assembly of claim 11 comprising a flow diverter rigidly mounted on the outer surface of the valve body, the flow diverter having a diverter shroud disposed over the bypass ports, the diverter shroud being spaced radially away from the bypass ports to allow fluid flow through the bypass ports and to divert the fluid flow downward along the outer surface of the valve body.

14. The drain-back check valve assembly of claim 11 comprising:

an annular flange disposed on the peripheral inner surface of the passageway, the annular flange having a poppet valve seat; and a spring disposed at a first end portion against the spool guide;

wherein, when the main poppet valve assembly is in the closed position, the spring resiliently biases the poppet disk into sealing engagement against the poppet valve seat and, when the main poppet valve assembly is in the open position the disk is disengaged from the poppet valve seat.

15. The drain-back check valve assembly of claim 14 comprising:

a plurality of mechanical stopping-posts extending radially inward from the peripheral inner surface of the passageway, the stopping posts each including an annular groove sized to receive a coil of the spring at a second end portion of the spring; and wherein, when the main poppet valve assembly is in the open position, the stopping-posts contact a distal end of the guide wall to mechanically limit a travel distance of the main poppet valve assembly from the poppet valve seat; and wherein the annular grooves hold the spring in resilient engagement against the poppet disk as the main poppet valve assembly reciprocates between the open and closed positions.

16. A method of operating a well system, the method including:

providing a well pump disposed within the well system;

providing a riser pipe disposed within the well and connected to a tank, the tank mounted on an aboveground surface;

providing a drain-back check valve assembly including:
a valve body including a passageway having an inlet connected to an outlet of the pump, an outlet connected to the riser pipe, and a plurality of bypass ports extending substantially radially to a central axis of the passageway, and
a main poppet valve assembly disposed in the passageway and moveable between a closed position which prevents fluid flow from the outlet to the inlet and an open position which allows fluid flow from the inlet to the outlet, the main poppet valve assembly including a poppet disk, and a spool guide rigidly fixed to the disk, the guide having a guide sidewall which includes a plurality of drain-back ports and spool guide openings extending substantially radially to the central axis,
wherein, when the main poppet valve assembly is in the closed position, fluid flow through the spool guide openings is prevented and the drain-back ports are aligned with the bypass ports to allow fluid flow through the bypass ports and,
when the main poppet valve assembly is in the opened position, fluid flows through the spool guide openings and the riser pipe, and the drain-back ports are not aligned with the bypass ports to prevent fluid flow through the bypass ports;

turning the pump on to pump fluid through the drain-back check valve assembly and the riser pipe to the tank, but not through the bypass ports; and turning the pump off to allow fluid to drain-back down the riser pipe, through the bypass ports and around outside surfaces of both the valve body the pump such that the riser pipe is drained of fluid down to the drain-back check valve assembly.

17. The method of claim 16 comprising:

sizing the spool guide openings to enable the pump to pump fluid through the riser pipe at a maximum fluid flow capacity of the pump when the pump is turned on; and sizing the plurality of bypass ports and drain-back ports to enable the fluid in the riser pipe to drain-back down the riser pipe and through the bypass ports at least at the maximum fluid flow capacity of the pump when the pump is turned off.

18. The method of claim 16 wherein the drain-back check valve assembly is greater than 25 feet below the above-ground surface.

19. The method of claim 18 wherein the drain-back check valve assembly is greater than 100 feet below the above ground surface.

20. The method of claim 16 comprising preventing backflow through the pump when the pump is turned off.

21. The method of claim 16 comprising:

providing a flow diverter rigidly mounted on the outer surface of the valve body, the flow diverter having a diverter shroud disposed over the bypass ports, the diverter shroud being spaced radially away from the bypass ports; and diverting the fluid flow downward along the outer surface of the valve body to prevent damage to a well casing of the well system.

22. The method of claim 16 wherein the pump is a submersible pump disposed in an aquifer, the method comprising:

turning the submersible pump on to pump a contaminated fluid out of the well system to the tank;

treating the contaminated fluid to remove at least a portion of the contaminant; and pumping the treated fluid back into the same aquifer through the same well system.

23. The method of claim 22 comprising:

preventing backflow through the submersible pump when pumping the treated fluid back into the same aquifer through the same well system.

24. The method of claim 23 wherein the well system is a plurality of well systems and the tank is a plurality of tanks in a tank farm.

* * * * *